J. T. JOHNSON.
COMBINATION FAUCET.
APPLICATION FILED MAR. 5, 1919.
1,336,236.
Patented Apr. 6, 1920.
3 SHEETS—SHEET 1.
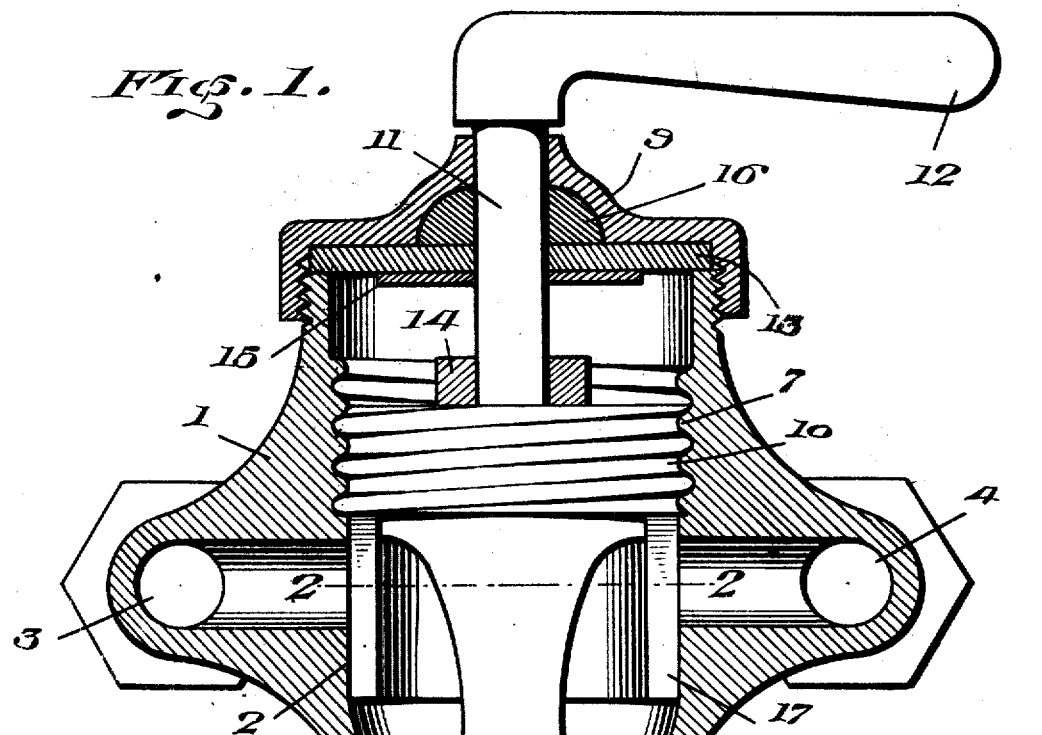
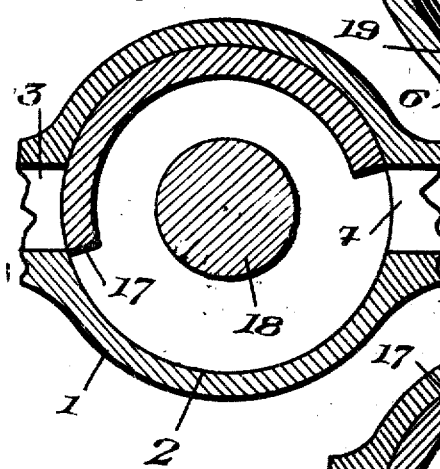
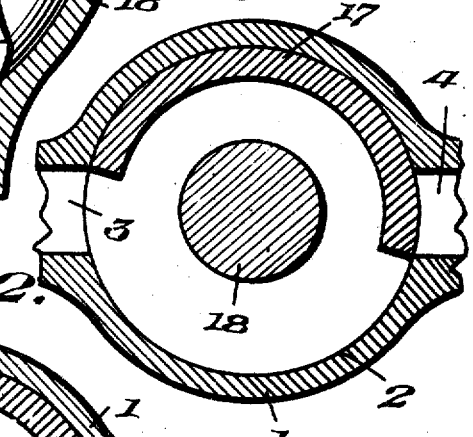
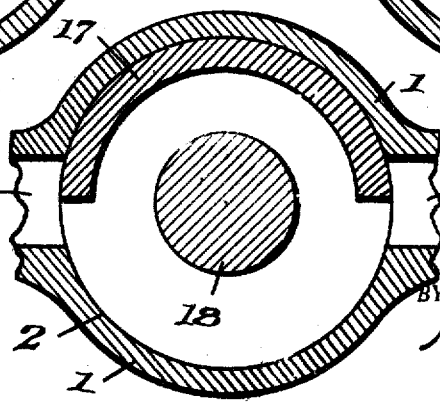
WITNESS:
Thos. W. Carey
INVENTOR.
J. T. Johnson
BY Monroe E. Miller
ATTORNEY.

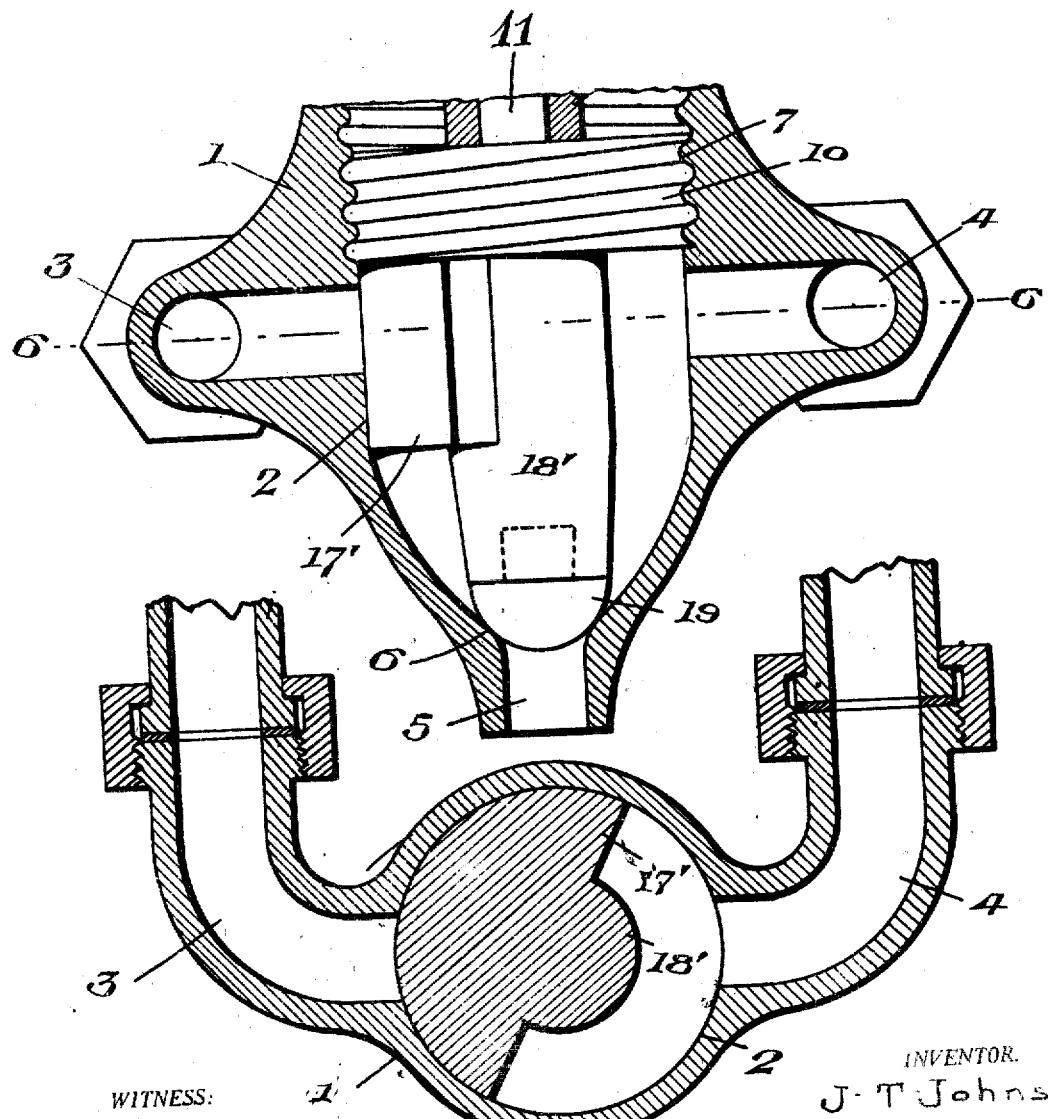

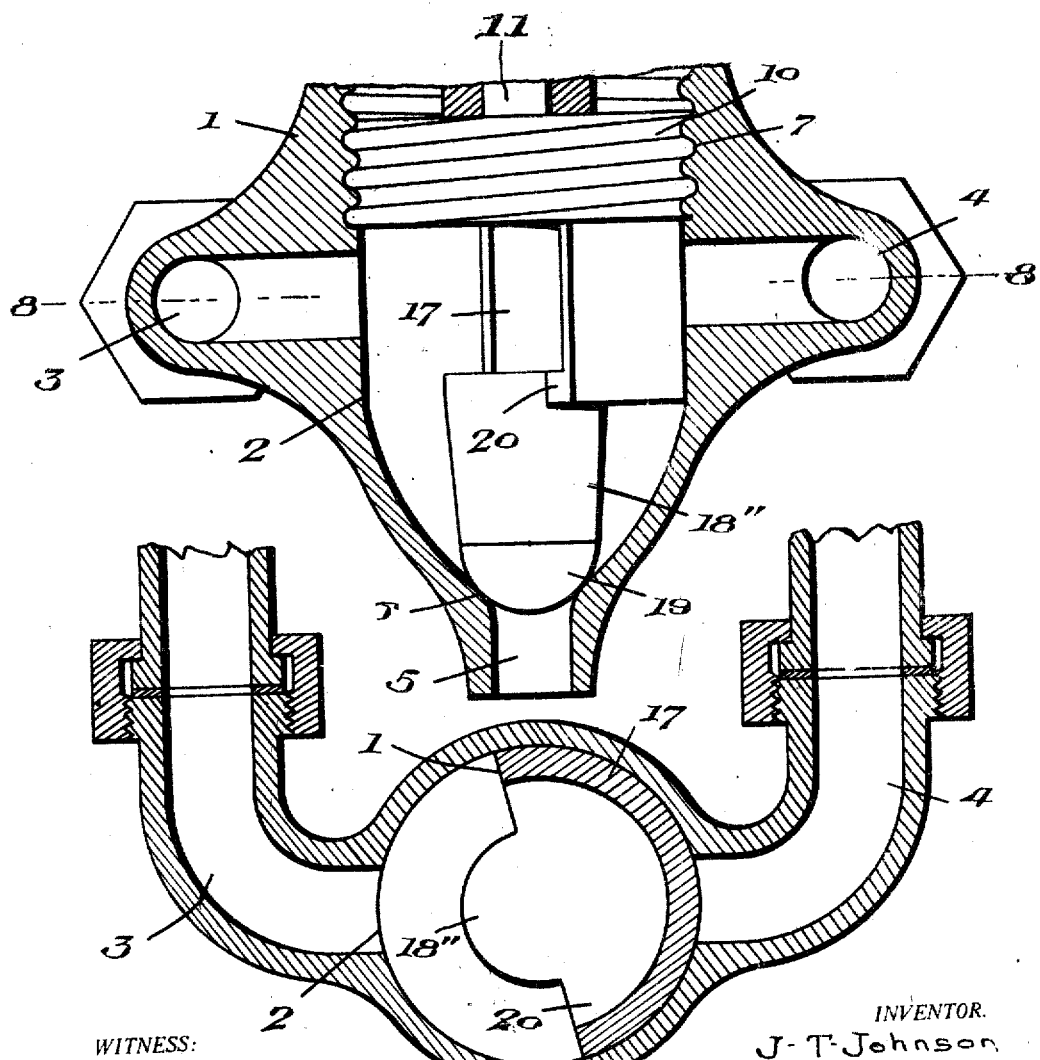

UNITED STATES PATENT OFFICE.

JACOB T. JOHNSON, OF ATLANTA, GEORGIA.

COMBINATION-FAUCET.

1,336,236.  Specification of Letters Patent.  Patented Apr. 6, 1920.

Application filed March 5, 1919. Serial No. 280,757.

*To all whom it may concern:*

Be it known that I, JACOB T. JOHNSON, a citizen of the United States, and resident of Atlanta, in the county of Fulton and State of Georgia, have invented new and useful Improvements in Combination-Faucets, of which the following is a specification.

The present invention relates generally to valves, and more particularly to faucets such as used as bath-tub, wash stand and sink fixtures for hot and cold water, it being the object of the invention to provide a novel and improved hot and cold water valve of such construction that it will be thoroughly practical and efficient in use.

The object of the invention is to provide a single valve for controlling the flow of hot and cold water, whereby the temperature of the water discharged can be regulated at the will of the user, and the invention further contemplates the provision of such a valve which is simple in construction and operation as well as saving time and trouble as compared with the use of individual hot and cold water valves.

A further object is to provide a hot and cold water valve having means operable for controlling the flow of hot and cold water as desired, and means beyond such controlling means for controlling the discharge of both hot and cold water.

The invention also has for its object the provision of such a device which can be manufactured and sold at low cost, and packed and transported in small space, and which will nevertheless provide a durable and efficacious valve for the intended purposes.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a vertical section of the valve, portions being shown in elevation.

Fig. 2 is a section on the line 2—2 of Fig. 1 showing the valve member in position for the flow of both hot and cold water.

Figs. 3 and 4 are similar sections showing the valve member turned for the flow of hot water only in one view and the flow of cold water only in the other view.

Fig. 5 is a view similar to Fig. 1 showing a modification.

Fig. 6 is a section on the line 6—6 of Fig. 5.

Fig. 7 is a view similar to Figs. 1 and 5, showing a further modification.

Fig. 8 is a section on the line 8—8 of Fig. 7.

The valve has a body or casing 1 of suitable metal provided with a vertical chamber 2 and hot and cold water inlet passages 3 and 4, respectively, leading to opposite sides of a smooth cylindrical wall of the chamber 2, the casing having suitable means for the connection of hot and cold water supplying pipes. The lower end of the casing 1 terminates in a discharge nipple or nozzle 5, and the lower end of the chamber 2 is gradually reduced in diameter so that the wall of the chamber converges and merges into the nozzle 5 and provides a valve seat 6 at the upper end of said nozzle. The chamber 2 is internally screw threaded, as at 7, at a point spaced above the passages 3 and 4. The upper end of the chamber 2 is closed by a cap 9 threaded onto the upper end of the casing.

The valve member 10 is externally screw threaded to engage the screw threads 7, and has an upstanding stem 11 projecting through the cap 9 and having attached thereto a suitable handle 12 for rotating the valve, it being noted that when the valve is turned it will be moved longitudinally within the chamber 2 as well as being rotated.

It is preferable to provide a rubber or other suitable gasket or washer 13 on the stem 11 to bear against the cap 9 and casing 1 and prevent leakage of water through the upper portion of the valve. This washer or gasket 13 is clamped against the cap collar 14 surrounding the stem 11 and seating on the valve member 10, and a metal washer 15 is preferably provided between the collar and gasket 13, and it is also preferable to provide a rubber or other suitable packing collar 16 on the stem 11 above the gasket 13 to fit in a recess in the cap. This or other suitable means can be provided to prevent leakage.

The valve member 10 is provided with means for controlling the flow of water from the passages 3 and 4 into the chamber 2 and for this purpose said member 10 is provided adjacent to its periphery with a depending arcuate apron or shutter 17 snugly fitting the wall of the chamber 2 and movable across the inner end of the passages 3 and 4, so that when the valve member is turned, said apron 17 may be moved to close either of said passages, as seen in Figs. 3 and 4, or may be moved to intermediate position as seen in Fig. 2, for the flow of both hot and cold water, and by turning the valve member slightly either way, the flow of hot and cold water can be regulated nicely and quickly. This apron 17 thus controls the discharge of hot and cold water from the passages 3 and 4 into the chamber 2, and in order to control the discharge of water from said chamber through the nozzle 5, the valve member 10 is provided with a depending finger or portion 18 concentric with and spaced from the apron 17 and provided at its lower end with a valve tip or head 19 to bear on the seat 6 with a compression fit. This valve tip 19 closes the discharge port of the valve, when the valve member is screwed down tight. Thus, the valve 19 shuts off the flow of water when the valve member is screwed down tight, and provides the main cut off for both hot and cold water, and the flow is established screwing the valve member upwardly, so as to raise the valve tip 19 off of its seat 6. The valve member can then be turned to control the flow of hot and cold water, and it will be noted that this control of hot and cold water by the apron 17 can be had when the valve tip 19 is raised to different distances. With the provision of a valve as above described, the function of the apron 17 is to regulate the flow of hot and cold water, while the flow of water from the valve is cut off by the valve tip or head 19 which in being compressed on the seat 6 will provide a tight fit so that there will be no possible leakage, as is an objection to hot and cold water valves heretofore used.

In the modification shown in Fig. 5, instead of using the apron 17 and finger 18, the valve member 10 has a depending central finger 18' with a segment 17' at one side fitting the wall of the chamber 2 to control the flow from the passages 3 and 4, said segment being integral with the valve member 10 and finger 18'.

Another variation is shown in Figs. 7 and 8, wherein the valve member 10 has a depending apron 17 like that one above described, and the lower edge of the apron 17 has a bottom 20 from which a stub 18" depends for holding the valve tip or head 19.

Having thus described the invention, what is claimed as new is:—

1. A valve comprising a casing having a chamber with a smooth cylindrical wall, a pair of inlet passages leading to said chamber, and a discharge outlet at one end of said chamber, said wall having screw threads at that side of said inlet passages opposite to the discharge outlet and spaced from said inlet passages, and a valve member screw threaded within said screw threaded portion of the wall, and having an arcuate portion extending therefrom and snugly fitting said smooth cylindrical wall and adapted to move across said passages, said valve member having a finger extending therefrom to seat over said outlet.

2. A valve comprising a casing having a chamber with a smooth cylindrical wall, a pair of inlet passages leading to said chamber, and a discharge outlet leading from the lower end of said chamber, the wall of the chamber converging to said outlet, said wall having screw threads at a point spaced above said inlet passages, and a valve member screw threaded within said threaded portion of the wall above said inlet passages and having a depending arcuate portion snugly fitting said smooth cylindrical wall, and adapted to move across said passages, said valve member having a depending finger to seat over said outlet within the converging portion of said wall of the chamber In testimony whereof I hereunto set my hand.

JACOB T. JOHNSON.